(12) United States Patent
Weber et al.

(10) Patent No.: US 6,384,557 B1
(45) Date of Patent: *May 7, 2002

(54) WINDSHIELD WIPER DRIVE DEVICE

(75) Inventors: Marcellus Weber, Lauf; Peter Braun, Buehlertal; Michael May, Offenburg, all of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/530,738

(22) PCT Filed: Aug. 31, 1999

(86) PCT No.: PCT/DE99/02716
§ 371 Date: Jun. 30, 2000
§ 102(e) Date: Jun. 30, 2000

(87) PCT Pub. No.: WO00/13948
PCT Pub. Date: Mar. 16, 2000

(30) Foreign Application Priority Data

Sep. 8, 1998 (DE) .......................... 198 40 895

(51) Int. Cl.$^7$ .................................. B60S 1/08
(52) U.S. Cl. ................. 318/444; 318/443; 318/DIG. 2; 15/250
(58) Field of Search ........................... 318/443, DIG. 2, 318/444; 15/250

(56) References Cited

U.S. PATENT DOCUMENTS

| 4,665,488 A | * | 5/1987 | Graham et al. ............. 364/424 |
| 5,225,752 A | * | 7/1993 | Yasuda et al. ............. 318/443 |
| 6,111,378 A | * | 8/2000 | LeMay et al. .............. 318/443 |

FOREIGN PATENT DOCUMENTS

| DE | 197 10 009 A | 9/1998 | |
| FR | 2 457 794 A | 12/1980 | |
| JP | 9-301131 A | * 11/1997 | ............. B60S/1/08 |
| WO | 98 076601 A | 2/1998 | |

OTHER PUBLICATIONS

Patent Abstract of Japan vol. 1998, No. 03 Feb. 27, 1998 & JP 09 301131 A, Nov. 25, 1997.

* cited by examiner

*Primary Examiner*—Robert E. Nappi
*Assistant Examiner*—Rita Leykin
(74) *Attorney, Agent, or Firm*—Michael J. Striker

(57) ABSTRACT

A windshield wiper drive device for driving a windshield wiper (11) in an alternating motion in a range of motion (17) between two turning point positions (A, C) includes a motor (1) for moving the windshield wiper (11), a detector (6) for detecting a time at which the windshield wiper (11) moves past a given position (A, C) in the range of motion (17), a control circuit (8) for reversing the direction of motion of the motor (1) at each turning point position (B, D), and an incremental transducer for detecting the distance traveled by the windshield wiper (11) from the given position (A, C). The control circuit (8) reverses the direction of motion of the motor (1) as soon as it is detected that the windshield wiper (11) has traveled a defined distance.

11 Claims, 5 Drawing Sheets

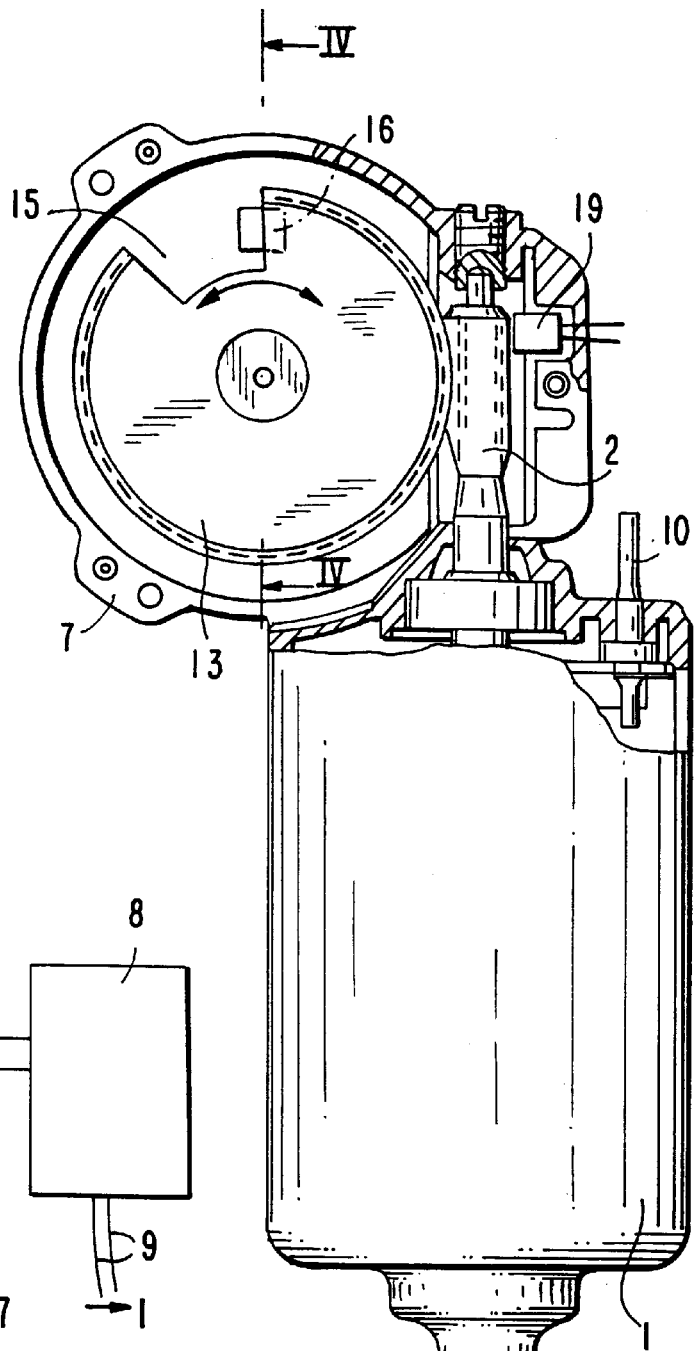
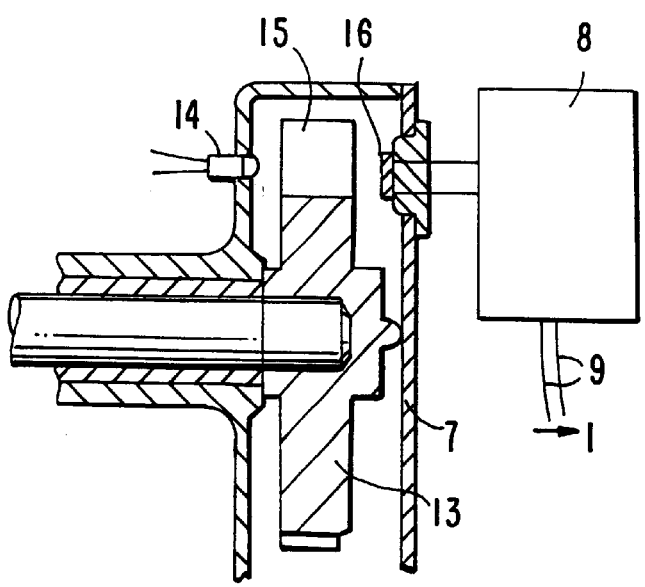
FIG. 3
FIG. 4

Figure 1:
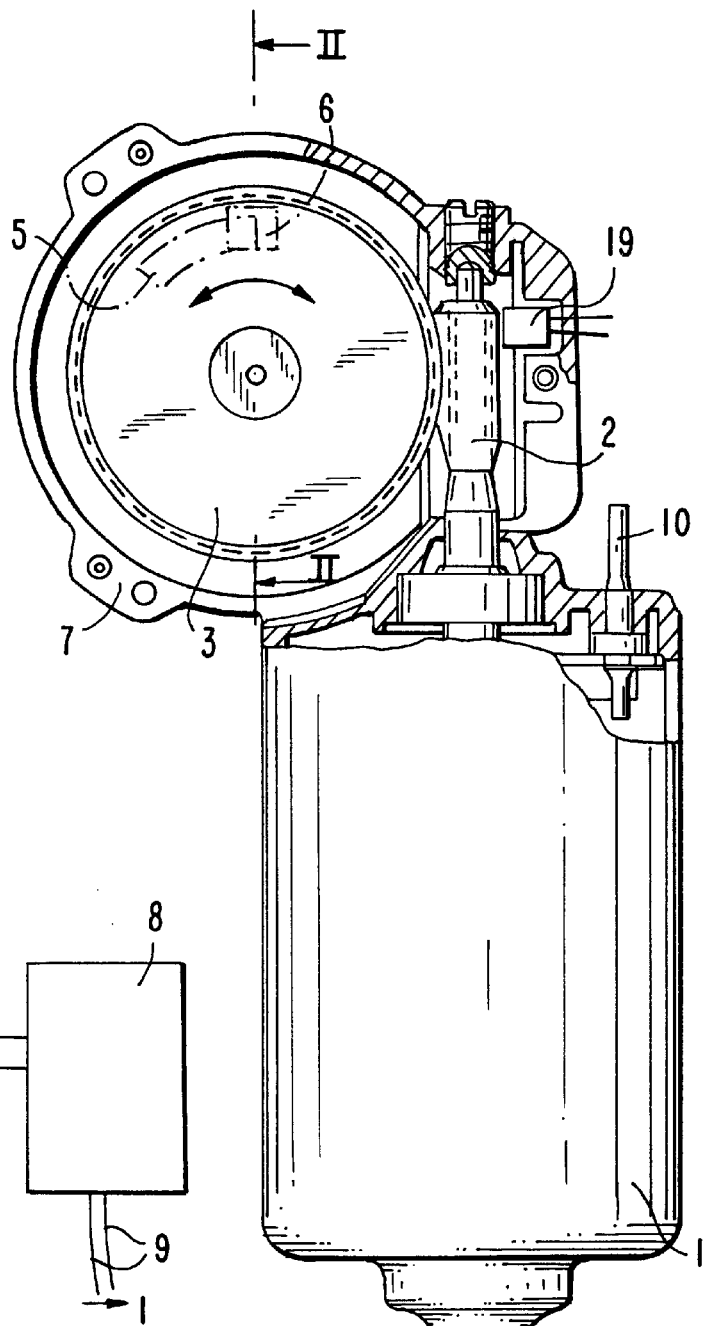
Figure 2:
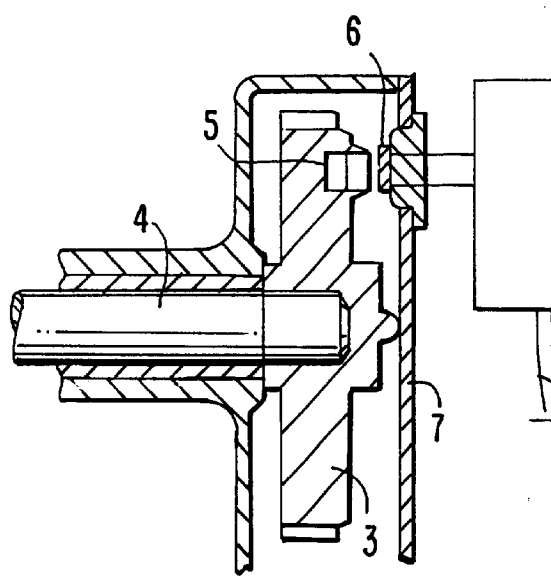
Figures 1, 5A:
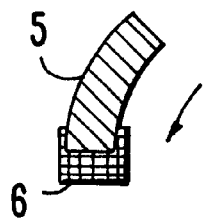
Figures 2, 5A:
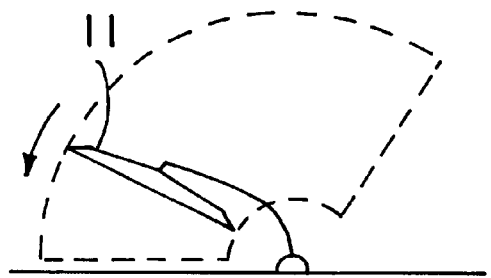
Figures 1, 5B:
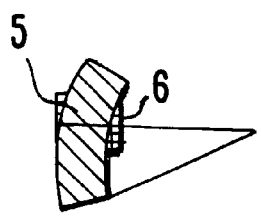
Figures 2, 5B:
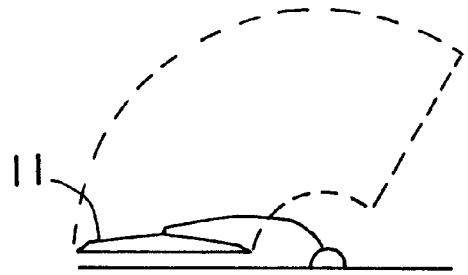
Figures 1, 5C:
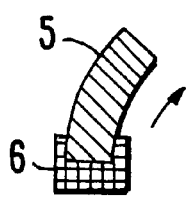
Figures 2, 5C:
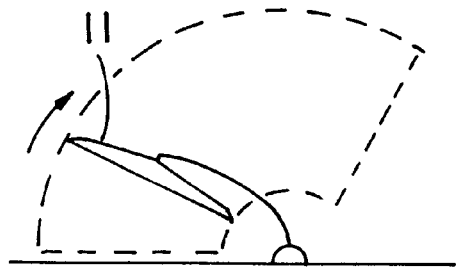
Figures 1, 5D:
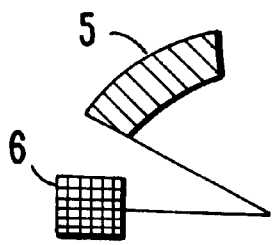
Figures 2, 5D:
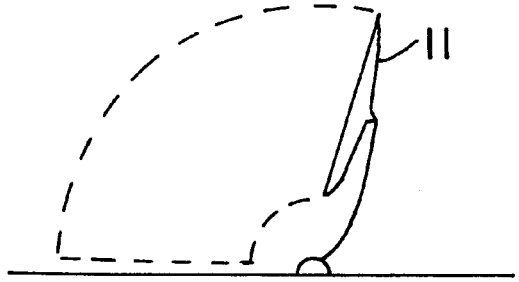

FIG. 5E-1
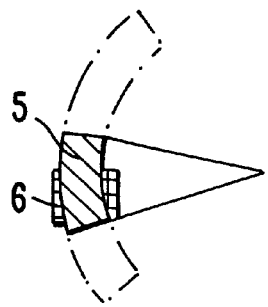
FIG. 5E-2
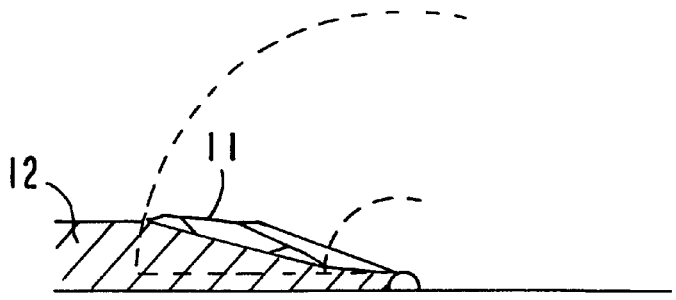
FIG. 5F-1
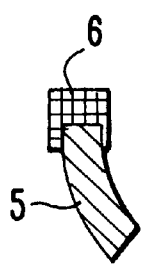
FIG. 5F-2
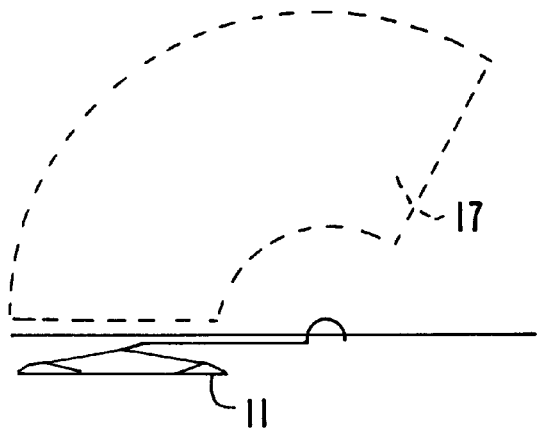
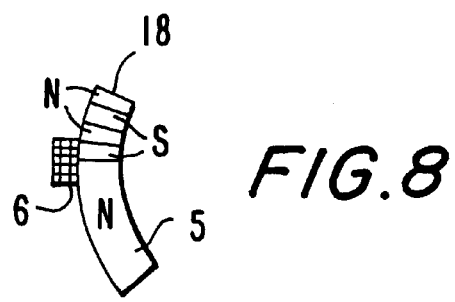
FIG. 8

WINDSHIELD WIPER DRIVE DEVICE

The invention relates to a windshield wiper drive device.

PRIOR ART

For a long time, windshield wiper drive devices have been known in which a rotary motion of a motor that rotates in a predetermined direction is converted into a reciprocating motion of the windshield wiper by means of an eccentric mechanism. Recently, windshield wiper drive devices in which the drive motor is controlled directly in different directions of rotation as a function of the reciprocating motion of the wiper have increasingly been introduced as well. In such drive devices, it is necessary to detect positions of the windshield wiper, at least at the turning points of its motion, so that the direction of rotation of the motor can be reversed at the correct time. Conventional drive devices use separate detectors for the various positions for this purpose, or else a single detector is used to detect a plurality of detectands, in other words objects of arbitrary type that can be detected by a detector; each detectand corresponds to one position to be detected.

This type of position detection for controlling the windshield wiper drive device is complicated and accordingly expensive. For this reason, windshield wiper drive devices of this type have until now been used primarily in motor vehicles in the upper price class, even though they have advantages that would make it desirable to use them more broadly. Specifically, while in drive devices with an eccentric mechanism the range of motion of the windshield wiper is predetermined by the eccentric mechanism, and accordingly a redesign of the drive device is needed for every vehicle model with a different range of motion, in a drive device with a reversing motor, it suffices to change the positions of a detector or a detectand, in order to thereby adapt the range of motion of the windshield wiper to the given conditions of each individual vehicle model. This flexibility of windshield wiper drive devices with a reversing motor moreover makes them especially well suited for use in windshield wiper systems with a recessed parking position.

ADVANTAGES OF THE INVENTION

The windshield wiper drive device is distinguished by its simple and flexible layout, which enables economical manufacture of the drive device and thus its use even in less-expensive vehicle models, and which also makes it simpler to adapt the windshield wiper drive device to the given conditions of arbitrary models of vehicles. According to the invention, it in fact suffices to detect merely a single given point of the range of motion of the windshield wiper directly with a detector; from this point, the sideways motion of the windshield wiper can be measured relatively with the aid of an incremental transducer, which in principle makes it possible to detect an arbitrary number of positions of the windshield wiper using a detector. The location of the turning points of the windshield wiper is defined by their distance from the point of the range of motion detected by the detector. How great this distance should be in one or the other direction of motion of the windshield wiper can be specified to the control circuit to suit, depending on the circumstances in which the windshield wiper drive device is used.

Especially if only two positions of the windshield wiper, namely the turning point positions, have to be detected, then the simplest option is for the defined distance from the given position to the turning point position to be the same for both directions of motion.

In an especially preferred further refinement of the invention, the control circuit includes a delay element, in order to reverse the direction of motion of the motor also whenever a certain time has elapsed since the passage of the windshield wiper through the given position. Specifically, if the motion of the windshield wiper is blocked by some obstacle, such as snow that has slid off the windshield, or the like, and for this reason the windshield wiper can no longer reach its turning point position, then in this further refinement the control circuit can reverse the direction of motion of the motor even before the actual turning point position is reached and can thus maintain wiper operation over a more limited range of motion. The delay element can be operative either for both directions of motion of the windshield wiper or selectively for only one of the two directions.

In a further preferred embodiment, it is provided that the detector, between a first of the two turning point positions of the windshield wiper and the given position, detects a signal having a first value that originates at a detectand, and detects a second value between the given position and the second turning point position. As a result, it is possible for the control circuit, when the windshield wiper drive device is turned on, to decide by calling up the signal value detected by the detector which side of the given position the windshield wiper is located on, and to select its initial direction of motion accordingly. The direction of motion is expediently selected such that the windshield wiper moves toward the given position, so that upon the passage through the position, the detector detects a change in the signal, on the basis of which the measurement of the relative travel distance measurement can be initialized with the aid of the incremental transducer.

Preferably, the detector and the detectand execute a motion relative to one another that is coupled to the motion of the windshield wiper. To that end, the detectand will mainly be secured to a mechanism that follows the reciprocating motion of the windshield wiper, while conversely the detector is stationary.

Various different designs of the detector and detectand are possible. For instance, the detector can be a magnetic field sensor, such as a Hall sensor, and the detectand can be a magnet pole whose field interacts with the magnetic field sensor. Alternatively, a wiper contact as the detector and a conductive surface connected to a given potential as the detectand, or a photodetector as the detector and a window in an opaque surface or an opaque region on a transparent substrate as the detectand can be considered.

To realize a windshield wiper parking function in the windshield wiper drive device of the invention, the control circuit is preferably equipped with a turn-off function; when the turn-off function is activated, the control circuit does not reverse the direction of motion of the motor when the windshield wiper has reached the first turning point position, but instead turns off the motor when the windshield wiper has reached an extreme position located on the far side of this turning point position.

This extreme position can, just like the turning points, be ascertained by using the incremental transducer to track the distance traversed by the windshield wiper from the given point.

Alternatively, it is possible to design the detectand in such a way that the signal detected by the detector at the extreme position changes over from the first to the second value. In that case, the reaching of the extreme position can also be determined directly with the aid of the detector.

In a further refinement, it is provided that an auxiliary detectand adjoins the detectand on the far side of the extreme position. This auxiliary detectand will never be detected by the detector during normal operation of the windshield wiper drive device; but if it is detected, this is an indication that an error has occurred in the coupling of the relative motion of the detector and the detectand to the motion of the windshield wiper, for instance because the windshield wiper has not been secured to its shaft in the correct position, so that the error has to be corrected to enable error-free operation of the windshield wiper.

Depending on the operative principle of the detector, the auxiliary detectand may for instance be a succession of alternating magnet poles, which in their motion in the detection range of the detector lead to a rapidly alternating signal, or a conductive surface connected to a second potential, or a partly transparent surface.

Further characteristics and advantages of the invention will be come apparent from the ensuing description of exemplary embodiments, taken in conjunction with the drawings.

DRAWINGS

Figure 6:
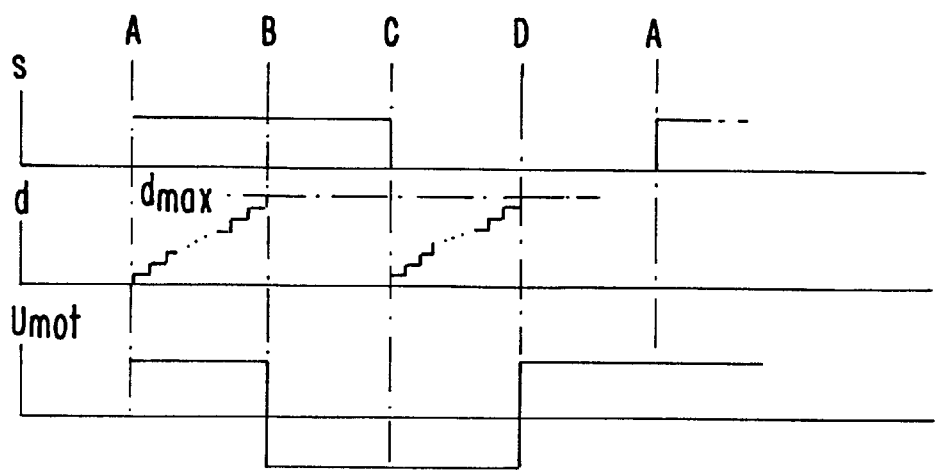
Figure 7:
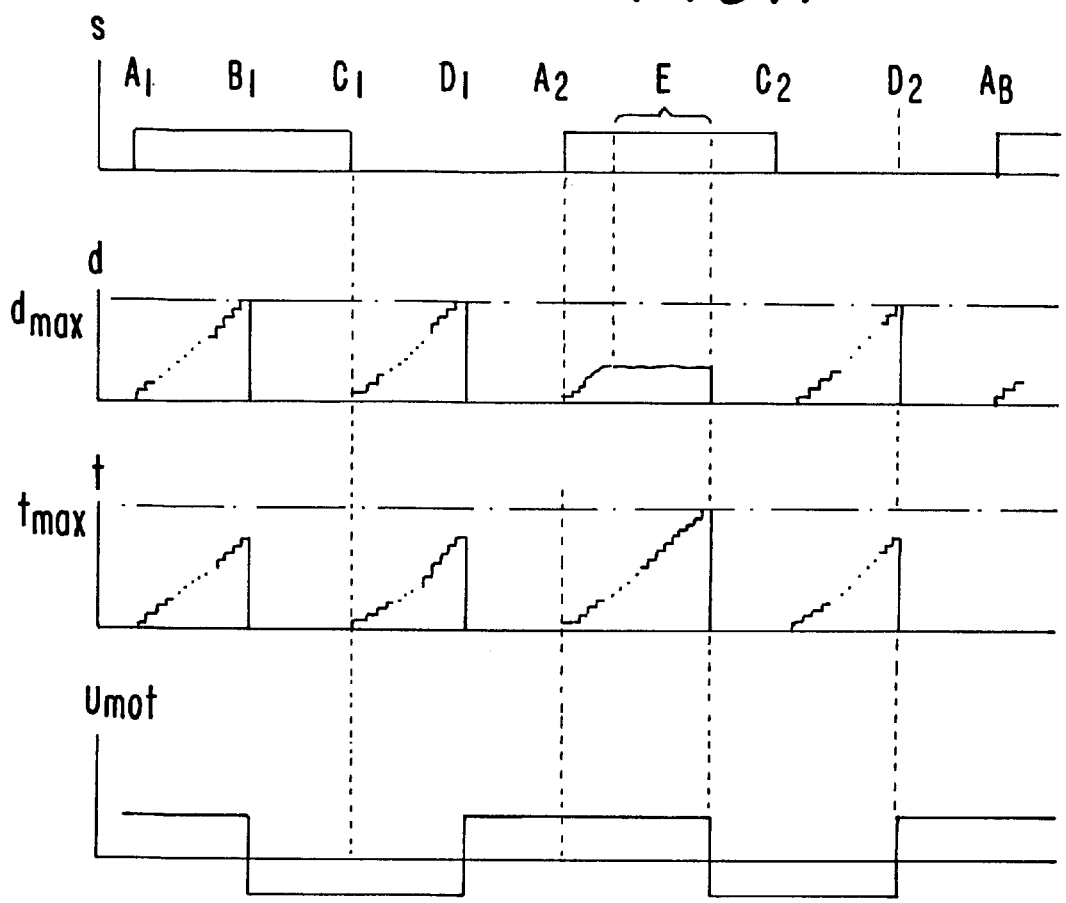

Shown are:

FIG. 1, part of a windshield wiper drive device of the invention;

FIG. 2, a section taken along the line II—II of FIG. 1;

FIG. 3, the part shown in FIG. 1, in a second embodiment of the invention;

FIG. 4, a section taken along the line IV—IV of FIG. 3;

FIG. 5, the detector and the detectand of the present invention in different phases of the cycle of motion of the windshield wiper;

FIG. 6, the course over time of individual signals of significance for controlling the windshield wiper drive device;

FIG. 7, the course over time of signals relevant for the control, in accordance with a further-refined embodiment of the invention;

FIG. 8, a detectand with an auxiliary detectand.

FIG. 9, the detector and detectand in a recessed position; and

DESCRIPTION OF PREFERRED EMBODIMENTS

FIG. 2, in a side view in fragmentary section, shows a motor 1 of a windshield wiper drive device of the invention and a reducing gear connected to it. The reducing gear includes a worm 2, which is secured on the shaft of the motor, and a worm wheel 3 driven by the worm 2. An incremental transducer 19 detects the rotation of the worm 2 and outputs a fixed number n of pulses per revolution of the worm to a control circuit 8 (see FIG. 2). Depending on the polarity of the supply voltages of the motor, which are applied to two supply terminals 10 (only one of which is visible in the drawing), the motor drives the worm wheel 3 either clockwise or counterclockwise. FIG. 2 shows the worm wheel 3 in a section taken along its axis, in the plane marked II—II in FIG. 1. The worm wheel is solidly connected to a drive shaft 4, which transmits the reciprocating motion of the worm wheel 3 to a windshield wiper (not shown).

The worm 2 and worm wheel 3 are accommodated in the same housing 7. A Hall sensor 6 is mounted in an opening of the housing 7, as seen particularly in FIG. 2. Opposite the Hall sensor 6, a magnet 5 is let into the worm wheel 3. The magnet is oriented such that the field axis extends parallel to the axis of the drive shaft 4, so that over the course of motion of the worm wheel 3, the same pole of the magnet 5 always faces toward the Hall sensor 6. The Hall sensor 6 and the magnet 5 are shown in FIG. 1 as outlines drawn with dashed lines, since in the perspective view of FIG. 1 the Hall sensor 6 is concealed by the worm wheel 3 and is therefore not actually visible, and the magnet 5 is located on the side of the worm wheel 3 away from the observer. The Hall sensor 6 outputs two different signal levels to a control circuit 8 depending on whether the magnet 5 is opposite it or not. From the change in the signal level of the Hall sensor 6, the control circuit detects that the windshield wiper has reached a given point along its path, at which point one edge of the magnet 5 is just then sweeping past the Hall sensor 6, as shown in the drawing. The details of this detection will be described further hereinafter.

FIGS. 3 and 4 show a second embodiment of the motor and reducing gear of a windshield wiper drive device of the invention. Elements that have already been described in conjunction with the embodiment of FIGS. 1 and 2 are identified by the same reference numerals and will not be described again.

In this second embodiment, the worm wheel has a sector-shaped cutout 15. This worm wheel is admittedly incapable of executing a complete revolution of 360°, but this is not a problem, since the windshield wiper, driven by way of the worm wheel 13 and the drive shaft 4 does not execute a complete revolution, either. In this embodiment, instead of a Hall sensor, a photodetector 16 is provided, such as a photodiode. On a side of the housing 7 opposite the photodiode, a light source 14, such as a light-emitting diode or LED, is let in. When the cut-out sector 15 is located between the light source 14 and the photodetector 16, the photodetector detects the projected light admitted by the sensor 15 and outputs a signal at a first value to the control circuit 8. If the worm wheel 13 is located between the light source 14 and the photodetector 16, then only very little light reaches the photodetector, and as a result a second signal level is output. Whenever the windshield wiper passes a given position along its path, which corresponds to the position in FIG. 3 of the worm wheel 3 or its cut-out sector 15 relative to the photodetector 16, the signal output by the photodetector 16 to the control circuit 8 changes its value, which enables the control circuit 8 to ascertain that the windshield wiper is passing the given positions.

It is understood that there are still other options besides the two described above for detecting the passage of the windshield wiper through the given position; for instance, the sector cutout 15 could be replaced with a slit in the worm wheel that extends over a suitable radius in the circumferential direction; the worm wheel could be substantially transparent and could be opaque only in the region of the corresponding sector, etc. Also, instead of the circumferentially elongated magnet 5 or the sector 15, a magnet without any significant length in the circumferential direction or a radial slit could be used; then the control circuit 8 would not have to detect the passage of the windshield wiper through the given position from a change in the signal but instead from the fact that the signal temporarily assumes a different value.

The mode of operation of the windshield wiper drive device of the invention will now be described in further detail in conjunction with FIG. 5: In FIG. 5, parts A, B, C, D, E, F indicate the position of the magnet 5 and the Hall sensor in the embodiment of FIGS. 1 and 2 as well as the associated position of a windshield wiper 11 in four different stages of its motion, which will hereinafter be called the A, B, C, D, F positions, corresponding to those parts of the drawing in which they are shown.

In part A, the windshield wiper 11 and the magnet 5 coupled to it move counterclockwise, and the magnet 5 is just now beginning to overlap with the Hall detector 6. The signal S (see FIG. 6) output by the Hall detector changes from 0 to a first value.

At the same time, the control circuit begins to add up counting pulses that are furnished by the incremental transducer 19. The result of the counting is shown in FIG. 6 as signal d. The signal d increases, until in the B position of the windshield wiper and the magnet, it attains a limit value $d_{max}$. As soon as this limit value $d_{max}$ is reached, the control circuit changes the polarity of the drive voltage $U_{mot}$ for the motor that it outputs via supply lines 9 (see FIGS. 2, 4), in order to reverse the direction of rotation of the motor and thus the direction of motion of the windshield wiper 11. Accordingly, the B position corresponds to the lower turning point position of the windshield wiper.

In its motion in the opposite direction, the magnet and the windshield wiper reach the position shown in part C, in which the magnet 5 is just now leaving the detection range of the detector 6. At this instant, the signal S drops back to 0, as can be seen in FIG. 6. Once again the control circuit begins to add up counting pulses of the incremental transducer 19 and thus generates signal d that increases in stairstep fashion. After a certain distance traversed, the signal d reaches its limit value $d_{max}$ in the position D, whereupon the motor driving voltage $U_{mot}$ again changes its sign. The windshield wiper now begins to move counterclockwise again and thus once again reaches the position shown at A, whereupon the cycle repeats.

As one can easily see, the location of the turning point positions of the windshield wiper motion is not predetermined by the construction of the drive mechanism; instead, it can be determined in a simple way by a suitable choice of the threshold value $d_{max}$ or by a choice of different threshold values for the two turning point positions. The drive device of the invention can thus easily be adapted to use in vehicle models with different-sized ranges of windshield wiper motion.

FIG. 7 shows the mode of operation of a further-refined embodiment of a windshield wiper drive device of the invention in terms of the course over time of the signal S of the Hall sensor 6; the value dx, formed by the control circuit 8; the distance traversed since the given point by the windshield wiper; a time delay value t, and the supply voltage output by the control circuit 8 to the motor 1 via the supply lines 9. This further-refined embodiment is distinguished from that described in conjunction with FIGS. 5 and 6 in that in it, the control circuit additionally includes a clock generator and a counter for counting the pulses output by the clock generator. The counted value of these pulses is the signal t shown in FIG. 7.

FIG. 7 first shows a normal operating cycle of the drive device, with phases A1, B1, C1, D1 that correspond to the A, B, C, D shown in FIG. 5 for the magnet and the Hall sensor or windshield wiper. The control circuit counts pulses of the incremental transducer 19 until the counted value d reaches a threshold value $d_{max}$. This is the case at each of the turning point positions B1 and D1.

In the second cycle shown, having the phases A2, E2, C2, D2, an obstacle 12 has formed on the window to be cleaned by the windshield wiper 11, such as a relatively large amount of snow on the lower end of the wiping region, as schematically indicated in the right-hand part of FIG. 5E. The left-hand part of FIG. 5E shows the corresponding position, marked E, of the magnet 5 and the Hall sensor 6; the entire range of motion of the magnet is represented as an outline 17 drawn with dashed lines.

The windshield wiper still passes normally through position A (phase A2), and the control circuit thus begins to count the pulses of the transducer 19; initially, the signal d increases. Simultaneously with the passage of the windshield wiper through the given position in phase A2, the control circuit begins to count the value t upward. In the first cycle shown, t was reset to 0 each time (in phases B1 and D1) when d reached the limit value $d_{max}$. In the second cycle, d does not reach the limit value $d_{max}$, because the windshield wiper has remained stuck in the position E shown in FIG. 5E. The counting process therefore continues until t attains a limit value $t_{max}$, and thereupon t and d are reset to 0. At the same time, the sign of the motor drive voltage $U_{mot}$ is reversed, and the drive motor changes its direction of rotation. In phase C2, the windshield wiper again passes through the given point, at which the signal S of the Hall sensor 6 changes its value. From there, the wiping motion proceeds normally, until the wiper is blocked a second time.

FIG. 5F shows the magnet 5 and the Hall sensor 6 and the windshield wiper 11 in a different further-refined embodiment of a windshield wiper drive device of the invention, in a position marked F, in which the windshield wiper 11 is located outside the range of motion 17 represented by the outline drawn with dashed lines. This position is assumed by the windshield wiper 11 whenever the windshield wiper is not needed. To allow this position F to be approached, it is provided in the further-refined windshield wiper drive device that the driver, when he actuates a switch to turn off the windshield wiper, sets a turn-off function of the control circuit 8 in motion. When the turn-off function is activated, the control circuit 8 no longer monitors whether the signal d is exceeding its limit value $d_{max}$ immediately following phase A. Thus the direction of the motor 1 is no longer reversed when the windshield wiper reaches the position B corresponding to phase B. Instead, the windshield wiper moves onward until such time as the magnet 5 has almost passed the Hall sensor 6, and the signal S of the Hall sensor 6 is beginning to drop again. If this is the case, the control circuit 8 turns the motor 1 off. Thus in this embodiment, the bottom edge of the magnet 5, in terms of FIG. 5F, is utilized to mark the given position A, C in the range of motion of the windshield wiper. From the other, upper edge of the magnet 5 in terms of the drawing, the reaching of the recessed position F of the windshield wiper is detected.

Alternatively, upon activation of the turn-off function, the limit value $d_{max}$, which corresponds to the position of the windshield wiper at the turning point position B, can be replaced by a higher limit value. In that case, the windshield wiper 11 moves on until reaching the position defined by the increased limit value, and when this position is reached the control circuit turns off the motor.

Turning off the ignition of a vehicle can lead to a situation in which the power supply to the motor is interrupted while the wiper is located at some arbitrary point between the turning point positions B and D, so that the wiper comes to a stop on the window. To assure in such a case that the windshield wiper will restart correctly when the ignition is turned on again, the control circuit determines the value of the signal S when the windshield wiper drive device is started. If this signal has reached the first value, then the windshield wiper is located either at the turning point position B or between that position and the given position A or C. In that case, the control circuit 8 selects the polarity of the supply voltage of the motor such that the motor starts up in the direction of the turning point position D, regardless of the direction in which the windshield wiper was moving before it was turned off. If conversely, from the value of the signal S, the control circuit learns that the wiper is located between positions A, C and D, then it drives the motor in the direction of position B. In this way, regardless of the starting position of the windshield wiper, the control circuit is initialized by a passage through the position A, C, so that it can correctly evaluate the counting pulses of the incremental transducer 19.

FIG. 8 shows a magnet 5, a Hall sensor 6, and auxiliary magnets 18 in a variant of the embodiment described in conjunction with FIG. 5F. Just as in FIG. 9, the magnet 5 and the Hall sensor 6 are shown in the position F. The magnets 18 are disposed, each with alternating polarity, adjoining the edge of the magnet 6 that marks the recessed position of the windshield wiper. If the windshield wiper drive device is correctly adjusted, then the auxiliary magnets 18 are never detected by the Hall sensor 6. At most, they can be detected if the position of the magnet 5, which is movable in common with the windshield wiper 11, has been incorrectly changed relative to the Hall sensor 6 in the course of repair or maintenance of the windshield wiper drive device. In such a case, it can happen that some of the auxiliary magnets, whose size is shown exaggerated in the direction of motion in comparison to that of the magnet 5, will move along ahead of the sensor 6 and thus cause a rapid alternation in the signal S. From this signal S, which fluctuates too fast in comparison with the distance actually traversed and reported by the incremental transducer, the control circuit can tell that the auxiliary magnets are being detected by the Hall sensor 6 and can correct the incorrect position, optionally automatically, or can cause an error report to be issued so that the problem can be quickly taken care of.

The present invention has been described here with a focus on magnets and a Hall sensor for detecting the position of the windshield wiper, but it is understood that the concept of the invention is not limited to a specific combination of detector and detectand. On the contrary, from the teaching provided above, it is readily possible for one skilled in the art to employ optical, electromechanical, or other means for the position detection.

What is claimed is:

1. A windshield wiper drive device for driving a windshield wiper (11) in an alternating motion in a range of motion (17) between two turning point positions (B, D), having a motor (1) for moving the windshield wiper (11), a detector (6) for detecting a time at which the windshield wiper (11) moves past a given position (A, C) in the range of motion (17) between the turning point positions (B, D), a control circuit (8) for reversing the direction of motion of the motor (1) at each turning point position (B, D) in response to a signal from the detector (6), characterized in that the windshield wiper drive device includes an incremental transducer (19) for detecting a distance traveled by the windshield wiper (11) from the given position (A, C) depending on a number of revolutions of a motor shaft of the motor (1); and that the control circuit (8) reverses the direction of motion of the motor (1) as soon as it is detected that the windshield wiper (11) has traveled a defined distance relative to the given position.

2. The windshield wiper drive device of claim 1, characterized in that the defined distance is the same for both directions of motion.

3. The windshield wiper drive device of claim 1, characterized in that the control circuit (8) includes a delay element, in order to reverse the direction of motion of the motor (1) as well, if a certain time $t_{max}$ has elapsed since the passage of the windshield wiper (11) through the given position (A, C).

4. The windshield wiper drive device of claim 1, characterized in that the detector (6), between a first turning point position (B) and the given position (A, C), detects a signal having a first value that originates at a detectand (5), and detects a second value between the given position (A, C) and the second turning point position (D).

5. The windshield wiper drive device of claim 4, characterized in that the control circuit (8) upon being turned on selects the direction of motion of the motor (1) as a function of the value of the signal (S) detected by the detector (6).

6. The windshield wiper drive device of claim 4, characterized in that the detector (6) and the detectand (5) execute a motion relative to one another that is coupled to the motion of the windshield wiper (11).

7. The windshield wiper drive device of claim 4, characterized in that the detector and the detectand are a magnetic field sensor (6) and a pole, associated with it, of a magnet (5), or a wiper contact and a conductive surface connected to a given potential, or a photodetector (16) and a window (15) in an opaque surface (13) or an opaque region on a transparent substrate.

8. The windshield wiper drive device of claim 1, characterized in that the control circuit (8) has a turn-off function, and the control circuit (8), when the turn-off function is activated, does not reverse the direction of motion of the motor (1) when the windshield wiper (11) has reached the first turning point position (B) but instead turns off the motor when the windshield wiper has reached an extreme position (F) located on the far side of this turning point position (B).

9. The windshield wiper drive device of claim 8, characterized in that the detectand (5) is designed such that at the extreme position (F), the signal (S) detected by the detector (6) changes over from the first value to the second value.

10. The windshield wiper drive device of claim 8, characterized by an auxiliary detectand (18), which adjoins the detectand on the far side of the extreme position (F), and whose detection by the detector (6) is an indication of an error in the coupling of the relative motion of the detector (6) and the detectand (15) to the motion of the windshield wiper (11).

11. The windshield wiper drive device of claim 10, characterized in that the auxiliary detectand is a succession of alternating magnet poles (18), or a conductive surface connected to a second potential, or a partially transparent surface.

* * * * *